United States Patent
Houel et al.

(10) Patent No.: US 9,842,087 B2
(45) Date of Patent: Dec. 12, 2017

(54) MULTI-SENSOR MEASURING METHOD AND SYSTEM

(71) Applicant: SNECMA, Paris (FR)

(72) Inventors: Jonathan Houel, Cherbourg (FR); Serge Le Gonidec, Vernon (FR)

(73) Assignee: Snecma, Paris (FR)

(*) Notice: Subject to any disclaimer, the term of this patent is extended or adjusted under 35 U.S.C. 154(b) by 400 days.

(21) Appl. No.: 14/432,739

(22) PCT Filed: Sep. 26, 2013

(86) PCT No.: PCT/FR2013/052266
§ 371 (c)(1),
(2) Date: Mar. 31, 2015

(87) PCT Pub. No.: WO2014/053747
PCT Pub. Date: Apr. 10, 2014

(65) Prior Publication Data
US 2015/0248375 A1    Sep. 3, 2015

(30) Foreign Application Priority Data
Oct. 1, 2012  (FR) ...................................... 12 59293

(51) Int. Cl.
*G01D 3/032* (2006.01)
*G06F 17/18* (2006.01)
*G05B 9/02* (2006.01)

(52) U.S. Cl.
CPC .............. *G06F 17/18* (2013.01); *G01D 3/032* (2013.01); *G05B 9/02* (2013.01)

(58) Field of Classification Search
CPC ............ G01D 3/032; G05B 9/02; G06F 17/18
See application file for complete search history.

(56) References Cited

U.S. PATENT DOCUMENTS

| 2005/0228619 A1* | 10/2005 | Burnet | G05B 9/03 702/189 |
| 2014/0320310 A1* | 10/2014 | Steinhardt | G01C 21/165 340/870.07 |

FOREIGN PATENT DOCUMENTS

| DE | 10 2010 023 387 A1 | 12/2011 |
| FR | 2 943 234 A1 | 9/2010 |

(Continued)

OTHER PUBLICATIONS

Search Report dated Jan. 23, 2014, in corresponding International Application No. PCT/FR2013/052266 filed on Sep. 26, 2013 (4 pages).

(Continued)

*Primary Examiner* — Bryan Bui
(74) *Attorney, Agent, or Firm* — Bookoff McAndrews, PLLC

(57) ABSTRACT

The measurement system having multiple sensors for sensing the same physical magnitude comprises at least one set of n redundant sensors or of models representing the same physical magnitude in order to deliver n measurement signals, a fusion unit for performing fusion that is the result of multiplexing the n measurement signals in order to deliver a single multiplexed output signal resulting from the fusion of the n measurement signals, and a reconditioned UKF receiving the multiplexed output signal to output a signal constituting the best estimate of the measurement of the physical magnitude after rejecting signals representative of a sensor failure.

10 Claims, 6 Drawing Sheets

(56) References Cited

FOREIGN PATENT DOCUMENTS

FR         2 972 528 A1     9/2012
WO     WO 97/07439      2/1997

OTHER PUBLICATIONS

Wan, Eric A. et al., "The Unscented Kalman Filter," Kalman Filtering and Neural Networks, Chapter 7, p. 221-280, 2001.

* cited by examiner

MULTI-SENSOR MEASURING METHOD AND SYSTEM

This application is the U.S. national phase entry under 35 U.S.C. §371 of International Application No. PCT/FR2013/052266, filed on Sep. 26, 2013, which claims priority to French Patent Application No. FR 1259293, filed on Oct. 1, 2012, the entireties of each of which are incorporated by reference herein.

FIELD OF THE INVENTION

The present invention relates to a method and a system using multiple sensors for measuring the same physical magnitude.

PRIOR ART

When a set of sensors is available for measuring the same physical magnitude, in order to determine which measurement is the best from among the measurements supplied by the various sensors, it is general practice to validate measurements mainly on the basis of voter-based logic in which the measurements are compared with one another.

A drawback of voter-based techniques lies in the fact that they need to be adapted on a case-by-case basis depending on the number of measurements available and as a function of the type of the measurement in question. In the process of making the controlling software available, it is necessary to perform unitary tests of each of the functions. That implies relatively high qualification costs and introduces risks associated with the diversity of functions.

OBJECT AND BRIEF SUMMARY OF THE INVENTION

An object of the present invention is to remedy the above-mentioned drawbacks and more particularly to perform fusion of data coming from sensors of any kind, and representative of the same physical magnitude, in order to estimate the best possible measurement, while rejecting the biases that may be present in certain sensors, due in particular to noise, to a jump in mean, or to the presence of sensors that have failed.

An object of the invention is thus to enable a single evaluation procedure to be implemented regardless of sensor types and regardless of the number of sensors.

These objects are achieved by measurement system having multiple sensors for sensing the same physical magnitude, the system being characterized in that it comprises at least one set of n redundant sensors or of models representing said same physical magnitude in order to deliver n measurement signals, a fusion unit for fusing the n measurement signals in order to deliver a single multiplexed output signal made up of the n measurement signals, and a reconditioned unscented Kalman filter (UKF) receiving said multiplexed output signal and configured to output a signal constituting the best estimate of the measurement of said physical magnitude after rejecting signals representative of a sensor failure.

The system of the invention thus makes it possible to fuse data coming from different sensors, and then process the data in order to evaluate a pertinent measurement that has been cleared of any error. This is performed with the help of simple data multiplexing followed by sending a single output signal representative of fusion of the measurement signals delivered by the sensors to a reconditioned unscented Kalman filter (UKF) for evaluating the best possible estimate and thus procuring a measurement that is not contaminated by error.

In a particular embodiment, the fusion unit comprises a counter for counting the number n of said sensors, a set of n conversion function modules for converting an electrical magnitude into a physical magnitude, the modules being respectively associated with each of the n sensors and adapted to store the information from said n measurement signals, a set of n zero-order blocking units, and a multiplexer unit adapted to select the individual measurement signals from the various sensors one after another and to deliver a single data stream to the input of the reconditioned UKF, which single data stream comprises all of the information from the n measurement signals.

According to a preferred characteristic, the reconditioned UKF processes at a speed not less than that of the fusion unit incorporating said multiplexer unit.

In a particular embodiment, the reconditioned UKF includes a non-linear filter unit representing the dynamics of variation in the output from the multiplexer unit.

Under such circumstances, in a particular aspect of the invention, the reconditioned UKF includes a test unit adapted to determine on each step of the multiplexer unit whether measurement signal information does or does not correspond to a value less than or equal to a prediction value of the filter unit minus an acceptable amplitude of variation or to a value greater than said prediction value plus an acceptable amplitude of variation, and if so, for causing the measurement signal information to be reset relative to the prediction value, and if not, for causing it to be reset relative to said measurement signal information and enabling the reconditioned UKF to be updated.

The invention also provides a method of measuring the same physical magnitude using a set of n redundant sensors or of models representing said same physical magnitude delivering n measurement signals, the method being characterized in that it comprises at least the steps consisting in multiplexing the n measurement signals in order to deliver a single multiplexed output signal fusing the n measurement signals, and in filtering said multiplexed output signal by a reconditioned unscented Kalman filter in order to output a signal containing the best estimate of the measurement of said physical magnitude after rejecting signals representative of a sensor failure.

According to a particular characteristic, the reconditioned UKF filtering step is performed with a processing speed not less than that of the multiplexing step.

Advantageously, the reconditioned UKF filtering step includes non-linear filtering representing the dynamics of variation in the output of a switching operation at the output of the multiplexing step.

According to a preferred characteristic, the reconditioned UKF filtering step includes a test for determining on each step of the switching operation whether measurement signal information does or does not correspond to a value less than or equal to a prediction value of the filtering step minus an acceptable amplitude of variation or to a value greater than said prediction value plus an acceptable amplitude of variation, and if so, for causing the measurement signal information to be reset relative to the prediction value, and if not, for causing it to be reset relative to said measurement signal information and enabling the reconditioned UKF filtering step to be updated.

BRIEF DESCRIPTION OF THE DRAWINGS

Other characteristics and advantages of the invention appear from the following description of particular embodiments given as non-limiting examples and with reference to the accompanying drawings, in which.

DETAILED DESCRIPTION OF EMBODIMENTS

Figure 1:
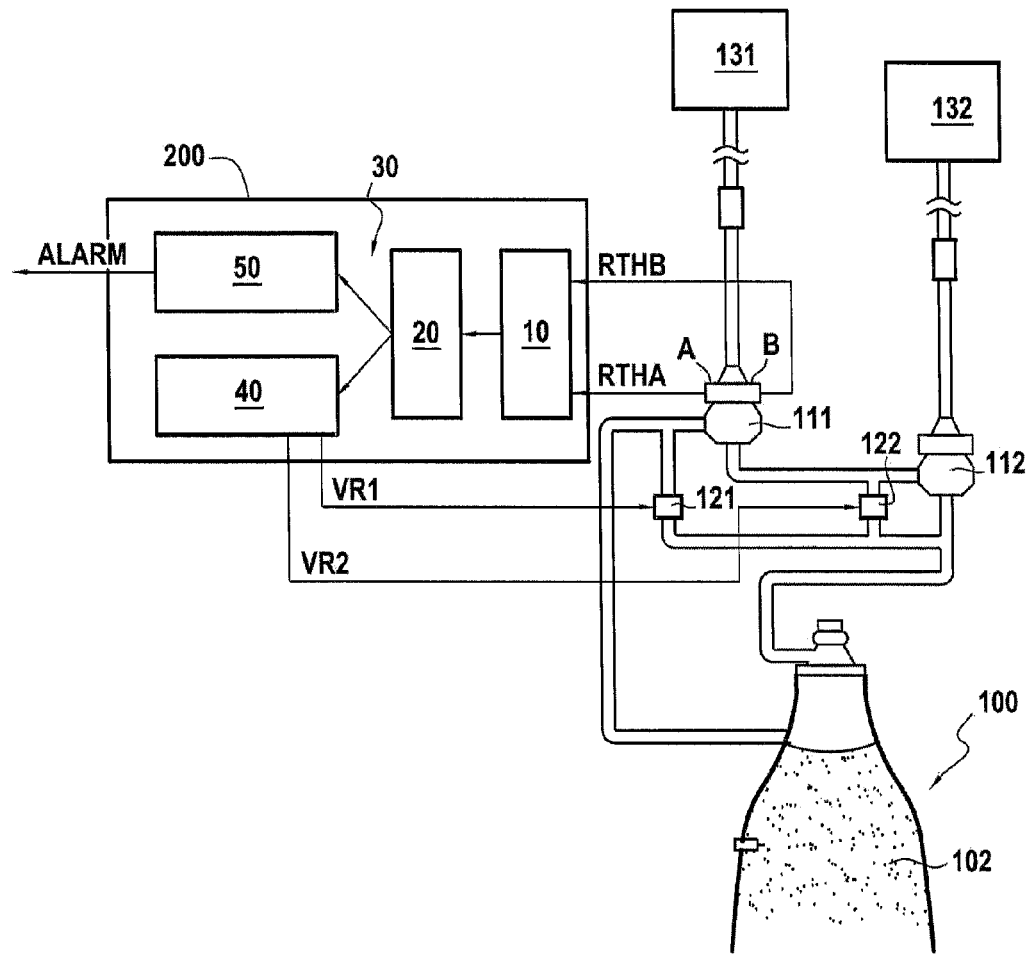
FIG. 1 is a diagrammatic view of a rocket engine and of its control system.

FIG. 1 shows a rocket engine 100 comprising a nozzle 102 fed from two propellant tanks 131 and 132, each situated upstream from a pump 111, 112.

The flow rate of each of the propellants can be controlled by valves 121, 122 arranged between the pumps 111, 112 and the nozzle 102.

The flow rate of each of the propellants is measured immediately upstream from each of the pumps 111, 112.

In the example application being described, in order to simplify explanations, only two measurements are fused, however the number of measurements that are fused may be much greater than two.

Two sensors A and B are arranged on the pump 111 and they measure its speed of rotation. These sensors provide two mutually independent measurements RTHA and RTHB representative of the speed of the pump 111.

The engine 100 includes a controller 200, itself made up of a regulator unit 40 and a monitor unit 50. The units 40 and 50 receive information that has been consolidated by the measurement filter unit 20.

The filter unit 20 receives the information RTHA and RTHB as conditioned and multiplexed by a fusion module 10.

By using the information as consolidated by the steps performed by the fusion module 10 and then by the filter unit 20, the regulator unit 40 is in a position to regulate the operation of the engine 100 by sending setpoints VR1 and VR2 for opening/closing the valves 121, 122 feeding the engine 100. Likewise, the monitor unit 50 is in a position to issue an alarm in reliable manner concerning an excessive speed of rotation of the pump 111.

Figure 2:
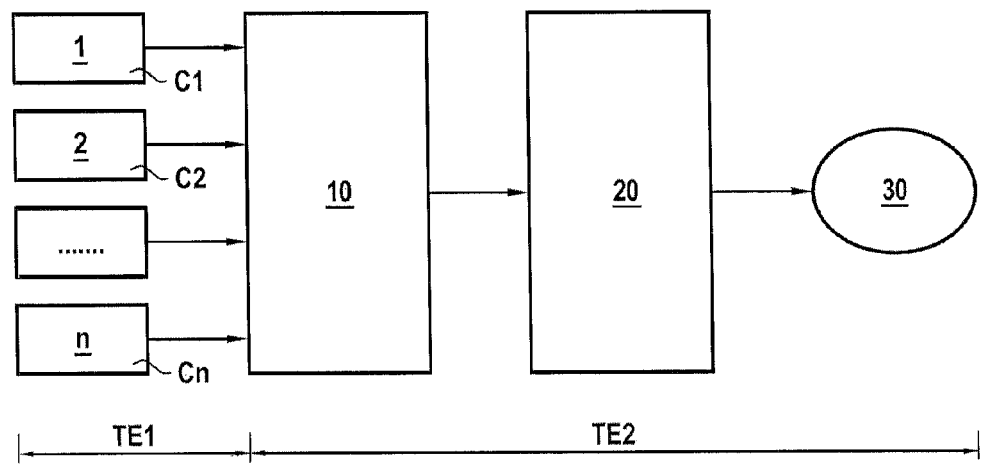
FIG. 2 is a block diagram of modules including the software components implemented in the system or in the measurement method of the invention.

The principle of the invention is illustrated by the block diagram of FIG. 2.

The system of the invention comprises a set of n redundant sensors C1, C2, . . . , Cn or of models, all representing the same physical magnitude. By way of example, the drawings show a set of four sensors C1 to Cn, however the number n could be any other integer number other than four.

With reference to the phase during which the data delivered by the n sensors C1 to Cn is acquired, there is a sampling time TE1 equal to N milliseconds.

The system of the invention has a first fusion unit 10 incorporating a multiplexing function 19 for multiplexing the data coming from the sensors C1 to Cn after prior conversion into physical magnitudes by the conversion functions of units 11 to 14 (FIG. 3) so as to output a single measurement comprising all of the preceding measurements including errors and data provided by sensors that are out of operation.

The output from the fusion unit 10 is connected to the input of a filter unit 10 comprising a reconditioned so-called "unscented" Kalman filter (UKF) to make it possible to estimate the best measurement from all of the sensors, rejecting anomalies by specific resetting. A signal 30 is thus obtained at the output from the filter unit 20 that constitutes the best estimate of the measurement.

The processing within the units 10 and 20 corresponds to a sampling time TE2 equal to TE1 divided by the number n of sensors.

Figure 3:
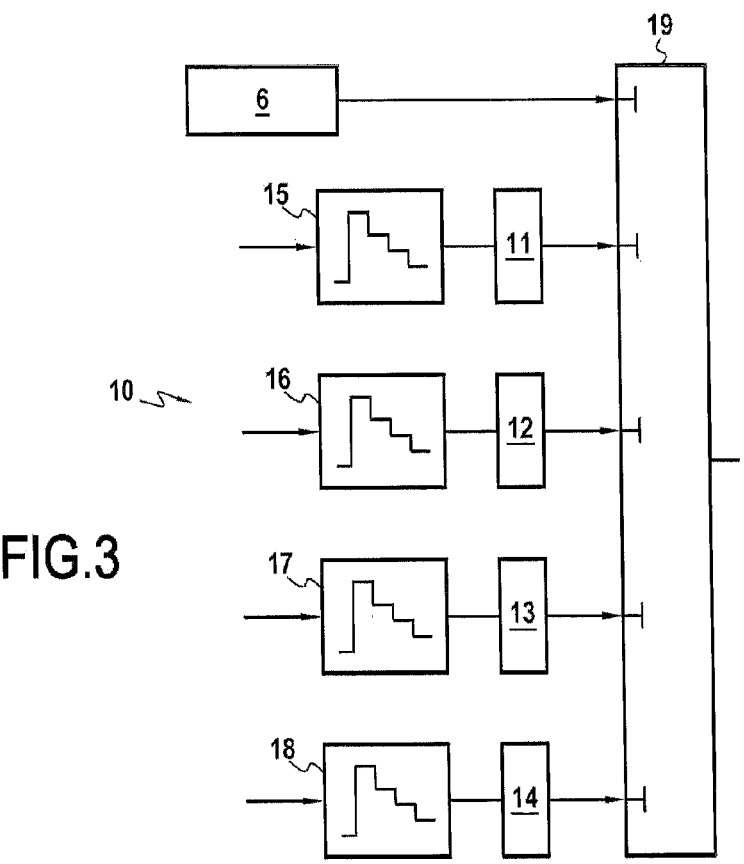
FIG. 3 is a more detailed view of a fusion unit including a multiplexer unit suitable for being incorporated in the FIG. 2 measurement system.

FIG. 3 shows an embodiment of the fusion unit 10.

In this example, the fusion unit 10 has a counter 6 for counting the number n of sensors C1 to Cn, a set of n units 11 to 14 performing conversion functions associated respectively with each of the n sensors C1 to Cn and adapted to record the information of the n measurement signals, and a set of n zero-order blocking units 15 to 18. Furthermore, in the fusion unit 10, a multiplexer unit 19 is adapted to select the individual measurement signals from the various sensors C1 to Cn one after another and to deliver them to the input of the reconditioned UKF 20 as a single data stream containing all of the information from the n measurement signals.

The multiplexer unit 19 is clocked using a sampling time TE2 that corresponds to the acquisition sampling time TE1 of the various sensors C1 to Cn divided by the number n of sensors C1 to Cn.

The multiplexer unit 19 thus serves to select the measurements from the various sensors C1, C2, . . . , Cn one after another and to obtain a single data stream containing all of the measurements. In order to select the measurements one after another, it is possible to use a simple counter 6 that starts at 1 and counts up to the number of sensors present. This operation is repeated throughout an evaluation.

There follows a description of an embodiment of the filter unit 20 of FIG. 2 which acts as a reconditioned UKF.

It should firstly be observed that information about "unscented" Kalman filters (UKFs) can be found in Chapter 7 entitled "The unscented Kalman filter" by Eric Wan and Rudolph van der Merwe taken from the work entitled "Kalman filtering and neural networks", published by Simon Haykin of John Wiley & Sons, Inc., in 2001.

The filter unit 20 constituted by a reconditioned UKF serves to estimate the physical magnitude measured by the sensors C1 to Cn by rejecting anomalies of the noise or bias type by specific resetting. In addition, the natural noise resulting from fusing the measurements of the sensors can be reduced with the help of a specific filter inserted in the filter unit 20.

In the filter unit 20, the UKF is used with a filter representing the possible dynamic range for variation in the physical system under measurement. This filter is non-linear since it incorporates variation speed saturations representative of the plausibility of variation in the filtered sensor measurement signal. Nevertheless, it must reject values that appear to be outliers (bias, sensor out of service, . . . ). The single stream at the input of the filter unit 20 comprises both useful information that is unbiased together with information from biased sensors, in particular once every N steps of the switch unit 19 if bias is present on only one of the sensors. In this situation, the code for a conventional UKF thus includes an additional condition that makes selective resetting possible as follows:

either it is considered that the input signal is unacceptable (to within a variation margin) and it is rejected by using the rejection step of the UKF (module 221) in order to replace the input signal in the resetting step of the UKF (module 222). In this situation, the prediction is representative of the inserted model and is itself considered as being good and uncontaminated by bias;

or else it is considered that the input signal is good, in which case resetting is performed normally by using the input signal and the step of updating the UKF.

The code for the additional condition added to the end of the UKF code may be summarized as follows:

IF(input_signal<=prediction−variation)(test 224)

OR(input_signal>prediction+variation)(test 224)

THEN reset relative to the prediction of the filter (module 226)

ELSE reset relative to the input signal (module 227)

END

Figure 5:
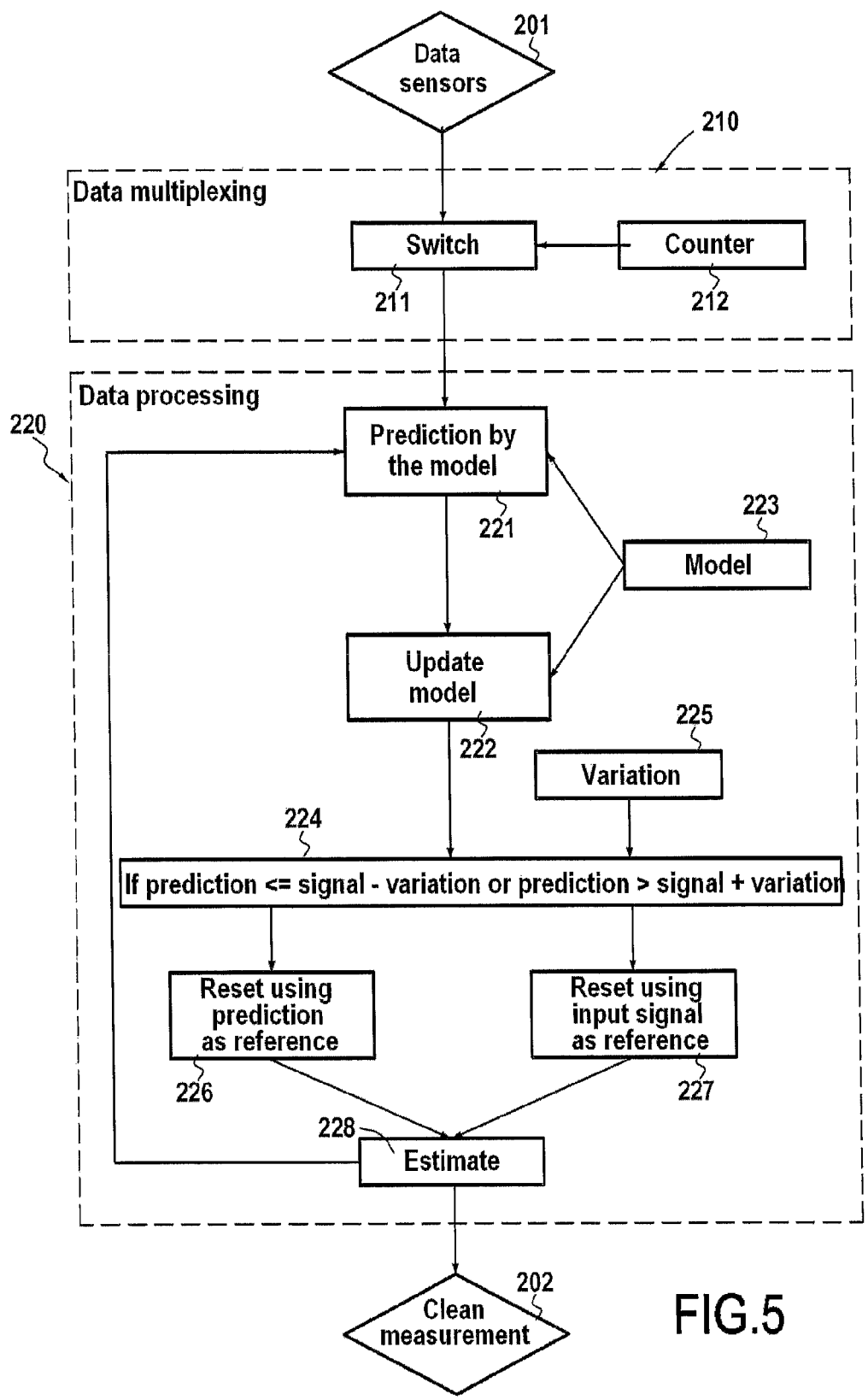
FIG. 5 is a flow chart summarizing the data multiplexing and data processing steps in the measurement method of the invention during which possible anomalies in the measurement signals are detected and corrected.

The solution for detecting and correcting anomalies is shown in the flow chart of FIG. 5.

A data multiplexer module 210 has a switch 211 associated with a counter 212 and receiving sensor data provided in a step 201.

A data processor module 220 has a module 223 defining a model, a module 221 for prediction using the model that receives the data from the sensors via the switch 211, and a module 222 for updating by using the model that receives the data from the module 223 and from the module 221.

The data processor module 220 also has a module 225 in which signal variation is stored and a test 224 whereby:

i) if the prediction determined in the module 221 and updated by the model is less than or equal to the signal minus the variation; or ii) if the prediction determined in the module 221 and updated by the model is greater than the signal plus the variation;

then resetting is performed in a module 226 using the prediction as the reference; else resetting is performed in a module 227 using the input signal as the reference.

The output from the module 226 or from the module 227 constitutes a unit 228 for storing an estimated value that is itself sent to the module 221 for prediction on the basis of the model and is applied as output to a unit 202 for providing a clean measurement.

Figure 6:
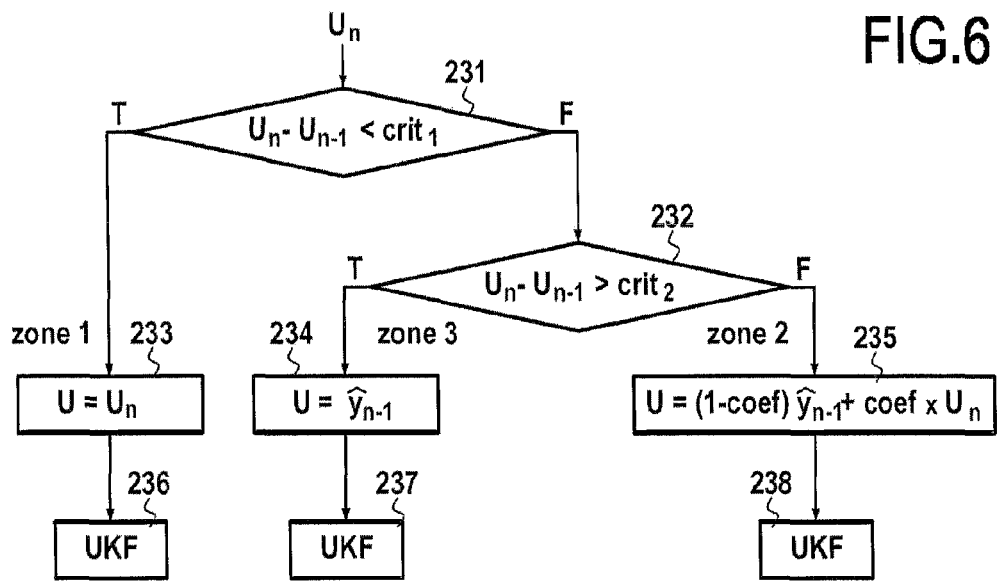
FIG. 6 is a flow chart representing a transition diagram for weighting signals depending on the distance between successive samples n and n−1.

A second solution, shown in the flow chart of FIG. 6, consists in using the estimation capacity of the UKF and in combining that capacity with an algorithm based on weighting associated with the bundles of uncertainties, in order to inform the filter of the outlier or non-outlier nature of the signal at the current instant.

Different tolerance zones are estimated by using the tolerated noise level or variation between two successive acquisition points.

Figure 4:
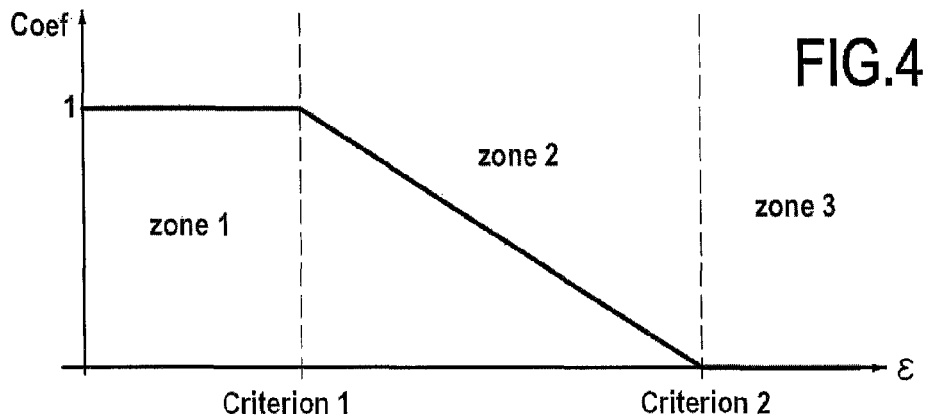
FIG. 4 is a graph showing the relationship for calculating the parameter Coef used in FIG. 6 while evaluating measurement signals.

FIG. 4 shows how a coefficient varies as a function of a value "epsilon" that represents the difference between the value of the signal at a current instant and its value at the preceding instant.

FIG. 4 shows three different situations defining three zones of the diagram:

zone 1: zone in which the point is deemed to be "correct" (the coefficient is equal to 1);

zone 2: "marginal" zone (after a criterion 1, the coefficient decreases from 1 to 0); and zone 3: zone in which the point is considered as being an outlier (after a criterion 2, the coefficient is equal to 0).

The way a point is taken into account is based on its position in the statistical window with weighting using the following formula:

$$u^* = (1-\text{coef}) \times \hat{y}_{i-1} + \text{coef} \times u_i$$

This principle is shown by the transition diagram of FIG. 6.

The principle is as follows: the value $U_n$ of the current signal (current instant "n") is compared with its value $U_{n-1}$ at the preceding instant (n−1) with respect to a first criterion $\text{crit}_1$ (step 231):

if the result is less than criterion 1 then the current signal is taken into account for the following estimate (instant "n+1"). This corresponds to zone No. 1 and the weighting coefficient is 1 (steps 233, then 236 for the UKF);

if the result is greater than criterion 1, then criterion 2 is tested (step 232) to determine whether $U_n - U_{n-1}$ is greater than the second criterion $\text{crit}_2$. If the result is greater than $\text{crit}_2$, then it is the preceding estimate that is taken into account for calculating the following estimate. This is zone No. 3 and the weighting coefficient is 0 (steps 234 followed by 237 for the UKF).

current and the previous estimate.

This lies in zone No. 2 (step 235) and the weighting coefficient varies in application of a straight line relationship represented by the following formula:

$$coef = -\frac{1}{crit_1 - crit_2} \times \varepsilon + \frac{crit_2}{crit_2 - crit_1}$$

It is specified below how the criteria 1 and 2 are determined:

the criterion 1 represents the desired theoretical acceptable uncertainty, and it is predefined:

$$\text{criterion } 1 = \text{margin} \times \sqrt{\sigma_1^2 + \sigma_2^2}$$

With:

margin=3 (safety margin) representing 99.7% probability;

$_1$ and $_2$ are the standard deviations on successive sensors 1 and 2; and there are two possibilities: either the standard deviations are accurately known, in which case it suffices to input the known values. Or else they are not, in which case it is possible to use the capacity of the UKF to estimate variance (and thus standard deviation).

It should be observed that criterion 1 encompasses bias and also noise applied to two successive sensors.

Criterion 2 incorporates the potential and acceptable speed of divergence of the signal (given the nature of the controlled system, its own speed of variation, mainly dictated by the speed at which the various valves can be switched), and consequently incorporates the "possible" variation for the operating point of the system:

$$\text{criterion } 2 = \text{margin } \sqrt{\sigma_{speed}^2 + \sigma_1^2 + \sigma_2^2}$$

with:

$_{speed}$: transform of the speed, which is a uniform relationship, into a normal relationship in order to be able to add it to the uncertainty previously estimated by the UKF. The transformation of the speed into a normal relationship is performed as follows:

$$\sigma_{speed}^2 = -\frac{(2 \times \text{speed}_{max})^2}{12}$$

Figure 7:
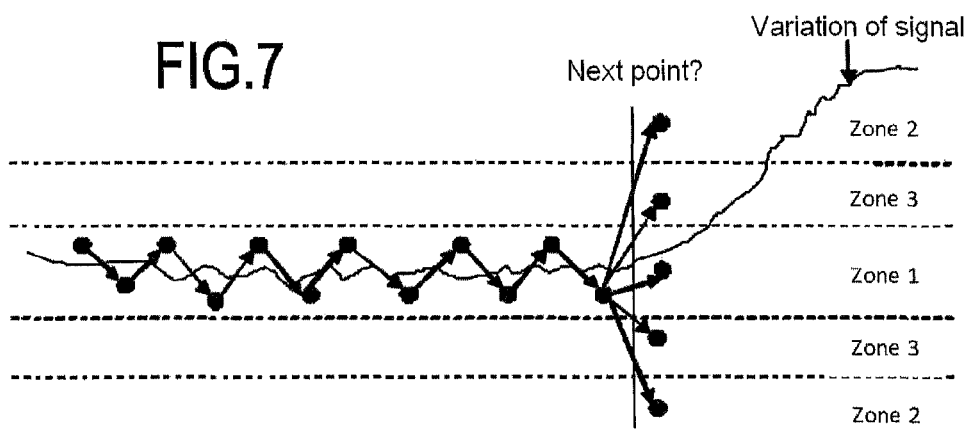
FIG. 7 is a graph showing a process for varying tolerance windows.

The process whereby tolerance windows vary is shown in FIG. 7 in which there can be seen three different zones for the situation of successive measurement points.

A detection flag indicates the zone in which the system lies:
flag at 0: no bias detected, estimation is performed on the basis of the current signal;
flag at 1: intermediate bias has been detected, estimation is made on the basis of weighting; and
flag at 2: excessive bias has been detected, estimation is performed on the previous estimate.

It may also be observed that the algorithm corresponding to speed saturation is not useful in this situation. The non-linearity of the model is now provided by the variable epsilon and the tests on criteria 1 and 2.

Figure 8B:
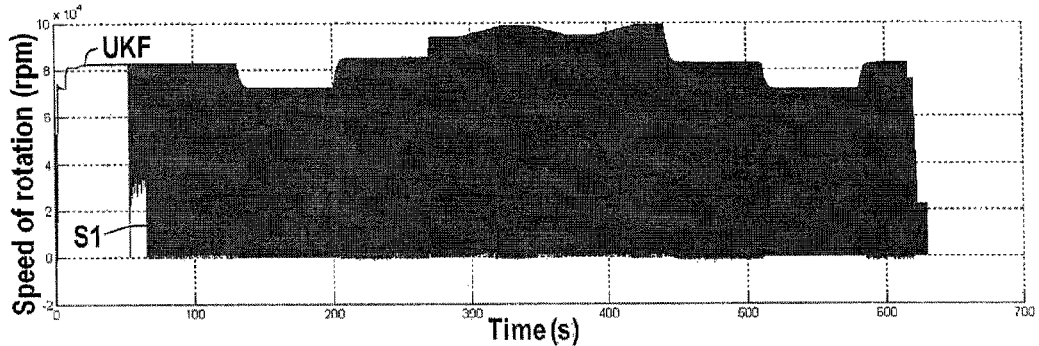
FIG. 8B shows, for this first example of detection flag results, the raw multiplexed signals together with the filtered output signal.
Figure 8A:
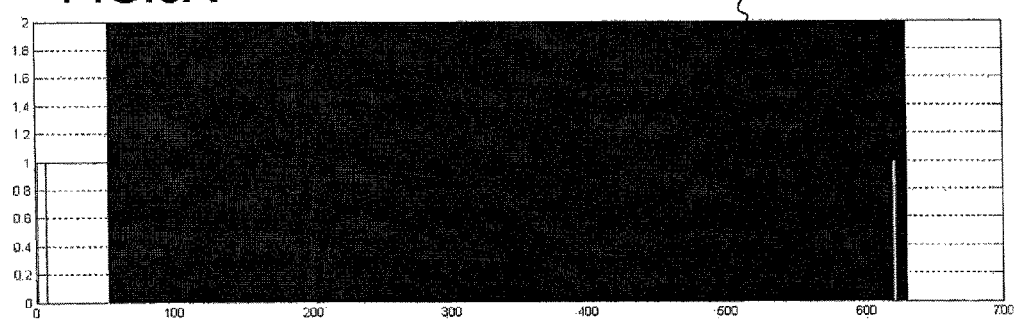
FIG. 8A shows a first example of detection flag results.

FIG. 8A shows an example of a detection flag D1 for a system measuring the speed of rotation of a turbopump feeding liquid hydrogen to a rocket engine.

FIG. 8B shows the form of a signal S1 and the UKF output for the measurement system example corresponding to FIG. 1.

Figure 9B:
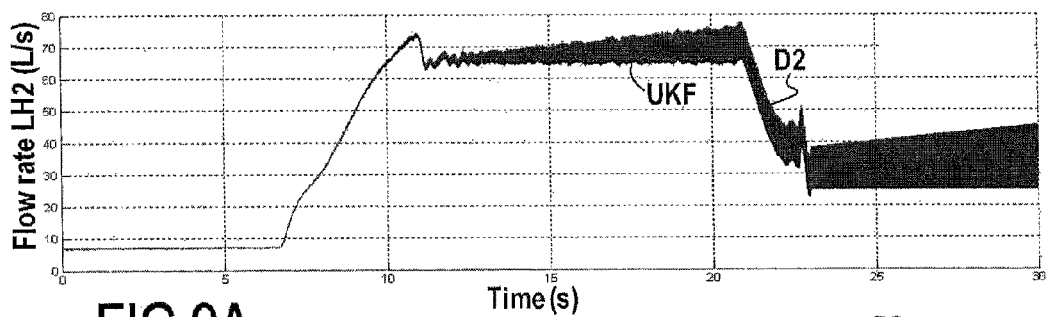
FIG. 9B shows, for this second example of detection flag results, the raw multiplexed signals and the filtered output signal.
Figure 9A:
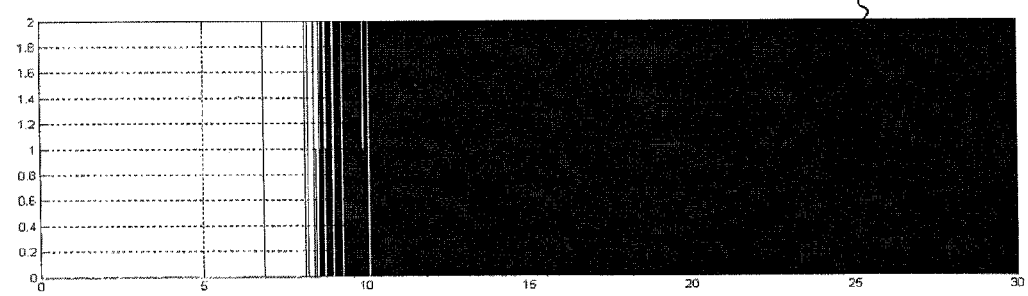
FIG. 9A shows a second example of detection flag results.

FIG. 9A shows an example of a detection flag D2 for a system measuring the flow rate of a turbopump feeding liquid hydrogen to a rocket engine.

FIG. 9B shows the form of a real signal S2 and of the UKF output.

Figure 10B:
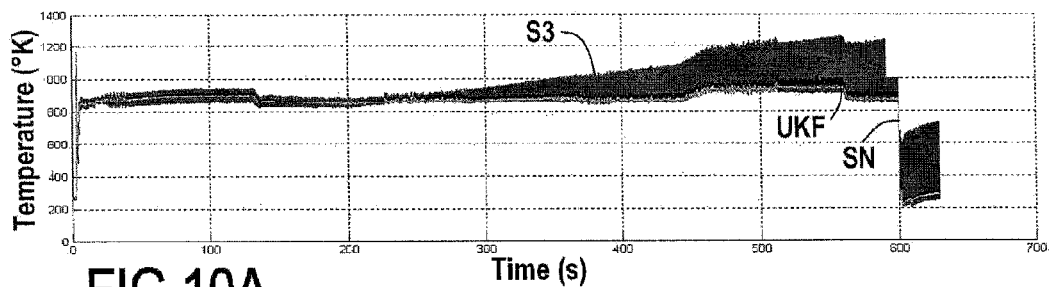
FIG. 10B shows, for this third example of detection flag results, the raw multiplexed signal together with the filtered output signal.
Figure 10A:
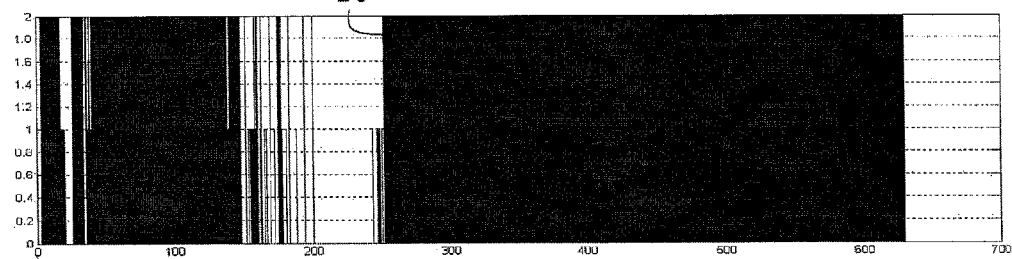
FIG. 10A shows a third example of detection flag results.

FIG. 10A shows an example of a detection flag D3 for a system measuring temperature within a rocket engine.

FIG. 10B shows the form of a real signal S3, of the UKF output, and of a nominal signal SN.

To summarize, it may be emphasized that the system of the invention differs in particular by using a multiplexer unit 19 enabling the measurements coming from the sensors C1 to Cn to be taken in turn and enabling the signal input to the filter unit 20 to be considered as delivering only one item of information.

The invention is also characterized by using a non-linear model for the measurement variation model.

The method and the system of the invention are also remarkable in that conditioned resetting is performed in a manner that is incorporated in the code of the UKF so as to enable outlier values to be rejected and so as to obtain a better estimate of the measurement from all of the sensors C1 to Cn.

The various modules of the measurement system of FIGS. 2 and 3 and the steps of the measurement method defined with reference to FIGS. 5 and 6 may be performed using a computer having one or more processors together with memory units.

The invention claimed is:

1. A measurement system having multiple sensors for sensing the same physical magnitude, wherein the system comprises at least one set of n redundant sensors or of models representing said same physical magnitude in order to deliver n measurement signals, a fusion unit for fusing the n measurement signals in order to deliver a single multiplexed output signal made up of the n measurement signals, and a reconditioned unscented Kalman filter (UKF) receiving said multiplexed output signal and configured to output a signal constituting an estimate of the measurement of said physical magnitude after rejecting one or more signals representative of a sensor failure, the rejected signal(s) having at least one value outside of an acceptable range,
wherein the fusion unit comprises a counter for counting the number n of said sensors, a set of n conversion function modules for converting an electrical magnitude into a physical magnitude, the modules being respectively associated with each of the n sensors and adapted to store the information from said n measurement signals, a set of n zero-order blocking units, and a multiplexer unit adapted to select the individual measurement signals from the various sensors one after another and to deliver to the input of the reconditioned UKF a single data stream comprising all of the information from the n measurement signals.

2. The system according to claim 1, wherein the reconditioned UKF processes at a speed not less than that of the fusion unit incorporating said multiplexer unit.

3. The system according to claim 1, wherein the reconditioned UKF includes a non-linear filter unit representing the dynamics of variation in the input from the multiplexer unit.

4. The system according to claim 3, wherein the reconditioned UKF includes a test unit adapted to determine on each step of the multiplexer unit whether measurement signal information does or does not correspond to a value less than or equal to a prediction value of the filter unit minus an acceptable amplitude of variation or to a value greater than said prediction value plus an acceptable amplitude of variation, and if so, for causing the measurement signal information to be reset relative to the prediction value, and if not, for causing it to be reset relative to said measurement signal information and enabling the reconditioned UKF to be updated.

5. A method of measuring the same physical magnitude using a set of n redundant sensors or of models representing said same physical magnitude delivering n measurement signals, wherein the method comprises at least the steps of multiplexing the n measurement signals in order to deliver a single multiplexed output signal fusing the n measurement signals, and in filtering said multiplexed output signal by a reconditioned unscented Kalman filter (UKF) in order to output a signal containing an estimate of the measurement of said physical magnitude after rejecting one or more signals representative of a sensor failure, the rejected signal(s) having at least one value outside of an acceptable range,
the method further comprising the steps of counting the number n of said sensors, converting electrical magnitudes into physical magnitudes, storing the information from said n measurement signals, selecting the individual measurement signals from the various sensors one after another, and delivering to the input of the reconditioned UKF a single data stream comprising all of the information from the n measurement signals.

6. The method according to claim 5, wherein the reconditioned UKF filtering step is performed with a processing speed not less than that of the multiplexing step.

7. The method according to claim 5, wherein the reconditioned UKF filtering step includes non-linear filtering representing the dynamics of variation in the output of a switching operation at the output of the multiplexing step.

8. The method according to claim 7, wherein the reconditioned UKF filtering step includes a test for determining on each step of the switching operation whether measurement signal information does or does not correspond to a value less than or equal to a prediction value of the filtering step minus an acceptable amplitude of variation or to a value greater than said prediction value plus an acceptable amplitude of variation, and if so, for causing the measurement signal information to be reset relative to the prediction value, and if not, for causing it to reset relative to said measurement signal information and enabling the reconditioned UKF filtering step to be updated.

9. A measurement system having multiple sensors for sensing the same physical magnitude, wherein the system comprises at least one set of n redundant sensors or of models representing said same physical magnitude in order to deliver n measurement signals, a fusion unit for fusing the n measurement signals in order to deliver a single multiplexed output signal made up of the n measurement signals, and a reconditioned unscented Kalman filter (UKF) receiving said multiplexed output signal and configured to output a signal constituting an estimate of the measurement of said physical magnitude after rejecting one or more signals representative of a sensor failure, the rejected signal(s) having at least one value outside of an acceptable range;

wherein the reconditioned UKF includes a non-linear filter unit representing the dynamics of variation in the input from the multiplexer unit; and wherein the reconditioned UKF includes a test unit adapted to determine on each step of the multiplexer unit whether measurement signal information does or does not correspond to a value less than or equal to a prediction value of the filter unit minus an acceptable amplitude of variation or to a value greater than said prediction value plus an acceptable amplitude of variation, and if so, for causing the measurement signal information to be reset relative to the prediction value, and if not, for causing it to be reset relative to said measurement signal information and enabling the reconditioned UKF to be updated.

10. The system according to claim 9, wherein the reconditioned UKF processes at a speed not less than that of the fusion unit incorporating said multiplexer unit.

* * * * *